United States Patent [19]

Hewitt

[11] Patent Number: 4,670,889
[45] Date of Patent: Jun. 2, 1987

[54] FREQUENCY CONTROL FOR POINT TO MULTIPOINT RADIO

[75] Inventor: Michael T. H. Hewitt, Ipswich, England

[73] Assignee: British Telecommunications plc, England

[21] Appl. No.: 647,487

[22] Filed: Sep. 5, 1984

[30] Foreign Application Priority Data

Sep. 7, 1983 [GB] United Kingdom ............... 8323966

[51] Int. Cl.⁴ ............................................. H04L 7/00
[52] U.S. Cl. ..................................... 375/107; 375/97; 375/109; 455/62; 455/69; 455/71; 370/71; 370/121
[58] Field of Search ...................... 455/3, 4, 5, 71, 69, 455/68, 70, 53, 54, 62, 75, 51; 375/109, 107.97; 370/69.1, 71, 121, 124

[56] References Cited

U.S. PATENT DOCUMENTS

| | | |
|---|---|---|
| 3,195,047 | 7/1965 | Ruthroff ............................ 455/69 |
| 3,443,024 | 6/1969 | Allen . |
| 3,654,395 | 4/1972 | Schmidt . |
| 3,688,205 | 8/1972 | Burger . |
| 4,061,979 | 12/1977 | Walker . |
| 4,188,582 | 2/1980 | Cannalte et al. ...................... 455/75 |
| 4,231,114 | 10/1980 | Dolikian .............................. 375/107 |
| 4,251,801 | 2/1981 | Le Mair . |
| 4,520,508 | 5/1985 | Reichert, Jr. ........................ 455/4 |

OTHER PUBLICATIONS

ICC '83 Conference Record of the International Conference on Communication, Boston, Jun. 19th-22nd, 1983; pp. D4.2.1.-D4.2.4., IEEE, US: Y. Manichaikul et al.: "RAPAC—A Point to Point System for Local Distribution".
Patents Abstracts of Japan, vol. 6, No. 251 (E-147) (1129), Dec. 10th, 1982; & JP-A-57 148 432 (Nippon Denki K.K.), 9-13-82.

Primary Examiner—Robert L. Griffin
Assistant Examiner—M. Huseman
Attorney, Agent, or Firm—Nixon & Vanderhye

[57] ABSTRACT

A multipoint radio system has a single node which communicates with a plurality of outstations on one frequency. The outstations using a different single frequency to communicate with the node. The node controls the transmission frequency at the outstations, e.g. by transmitting error signals which adjust the set points of frequency control loops in the outstations. In a preferred embodiment the node allows for residual errors by adjusting the decision threshold of its regenerator to the outstation on transmission.

17 Claims, 7 Drawing Figures

FREQUENCY CONTROL FOR POINT TO MULTIPOINT RADIO

This invention relates to a digital communication system in which a plurality of radio outstations communicate with a common node using two radio-frequencies, ie one for communication from the outstations to the node and the other for communication from the node to the outstations.

Radio transmission from the node to the outstations takes the form of a continuous signal but the information carried by the signal is divided into time slots intended for individual outstations. The receivers at the outstations pick-up the whole of the transmission from the node and each outstation selects its own information. The receivers at the outstations lock onto the continuous signal and this enables them to achieve long term radio frequency stability.

The conditions for transmission from the outstations to the node differ considerably: each outstation has a transmitter which for economic reasons may be less stable in frequency than that at the node and each in turn transmits a short burst to the node. Thus the node's radio receiver has to cope with a sequence of signals of different origin.

In many systems the information is carried by frequency shift keying (ie FSK) and especially FSK using two keying states, (ie 2-FSK). Data is recovered from the demodulated output of the receiver by a regenerator which requires an accurate decision threshold. In a single point-to-multipoint system, eg as described above, the outstations may all have different transmitter frequencies which complicates the process of data recovery. It is an object of this invention to reduce frequency differences between the outstations and to reduce the effect of residual outstation frequency error on the data recovery.

According to this invention the transmitters at the outstations are controlled from the node so that each remains close enough to a specified frequency for the system to operate satisfactorily. By assigning ultimate control of the frequency of each outstation to the node there is only one frequency standard in the system and all the outstations tend to conform to this standard. There is also a cost advantage in that it is unnecessary to install a plurality of expensive control systems; ie it is unnecessary to install one at each outstation.

More specifically, in a system according to the invention, the node assesses the frequency error of each outstation and returns to each outstation a signal indicating its error. Each outstation adjusts the frequency of its transmission in accordance with its received error signal and in such a manner as to reduce the error. Preferably continuous frequency control is assigned to a local feed-back loop at each outstation and stability of the local loop is enhanced by adjusting its set point in accordance with the error signals from the node.

The frequency control just described leaves residual errors and the effect of these on data recovery is reduced by deriving an electrical signal proportional to the average incoming radio frequency during the marker-signal at the beginning of each burst and using said signal as the decision threshold for data recovery. This method assumes that the short term frequency stability is good enough for the whole of a burst (usually of a few tens of microseconds duration) to be at constant frequency. In other words the signal derived during the marker-signal provides a threshold voltage which is a better basis for decision than a pre-set threshold.

The invention will now be described, by way of example, with reference to the accompanying drawings (being diagrams in block schematic form) in which.

Figure 1:
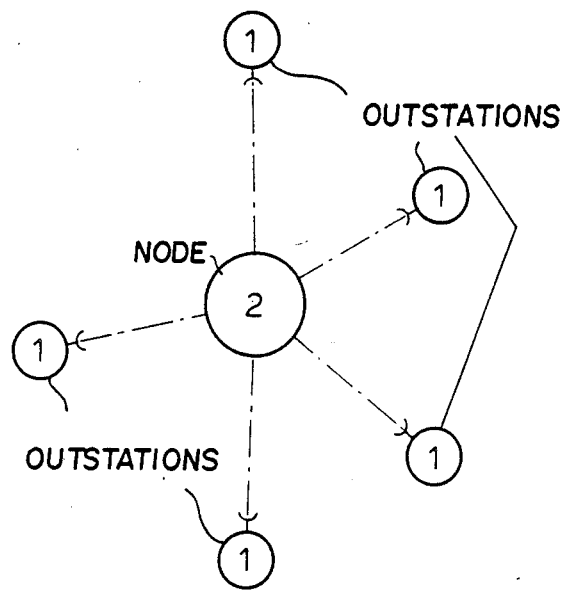
FIG. 1 illustrates the system as a whole.
Figure 2:
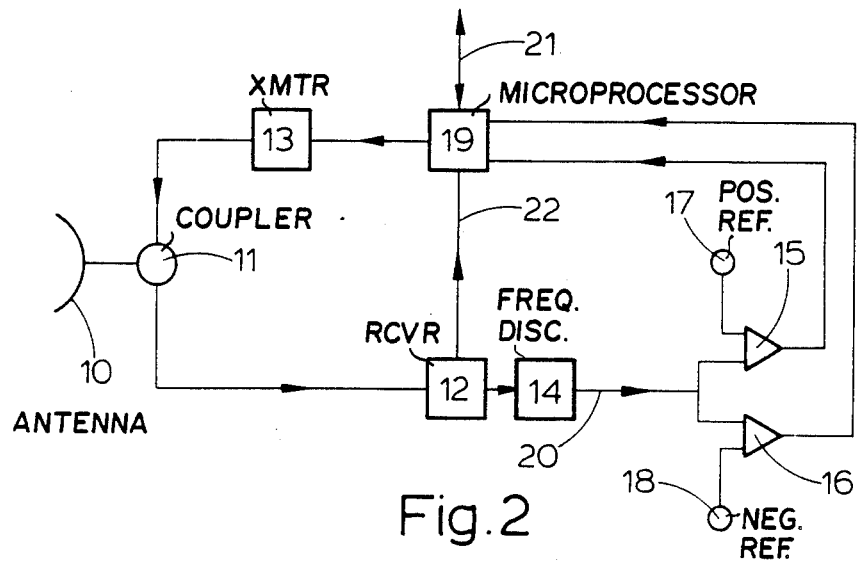
FIG. 2 illustrates an arrangement for use at the node.
Figure 3:
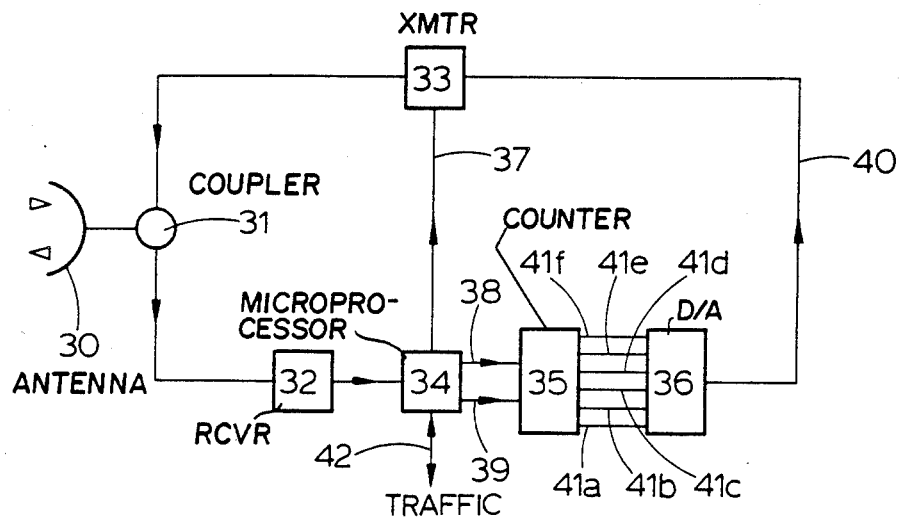
FIG. 3 illustrates an arrangement for use at an outstation in communication with the node illustrated in FIG. 1.

The system as a whole is shown in FIG. 1. It comprises a plurality of outstations, each designated by the numeral "1", which communicate with a node 2. Only five outstations are shown but an operational system could include up to several hundred. Communication takes place on two frequencies, ie one for transmission from the node 2 to all the outstations 1 and the other used by all the outstations 1 for transmission to the node 2. Communication from the node 2 to the outstations is continuous and therefore conventional techniques are used to lock the various receivers onto the radio frequency of the continuous transmission. Communication from the outstations 1 to the node 2 takes place in bursts and each burst originates from a different transmitter. It is, therefore, necessary to keep all the outstation transmitters on the same frequency or at least close enough for the system to function. FIGS. 2 and 3 describe a node and outstation which include frequency control according to the invention.

The node shown in FIG. 2 comprises an antenna 10, used simultaneously in both the send and receive modes. In the receive mode coupler 11 connects the antenna 10 to receiver 12. In the send mode coupler 11 connects transmitter 13 to antenna 10. Receiver 12, which includes conventional demodulation and regeneration stages, passes regenerated data to a microprocessor 19 on line 22. Receiver 12 also produces a DC signal indicative of the frequency received by antenna 10; in the case of a system using frequency modulation the output of the frequency discrimination 14 is suitable. This signal passes on line 20 which bifurcates to maximum positive error detector 15 (with reference 17) and maximum negative error detector 16 (with reference 18). Error detectors 15 and 16 are connected to microprocessor 19 which also receives and sends the traffic on line 21. Microprocessor 19 is also connected to transmitter 13.

Reception at the node comprises a series of bursts, ie one from each outstation, and each burst commences with a marker signal. Communication follows each marker. The operation of the node during one burst of reception will now be described.

The burst transmission is picked up by antenna 10 and passed, via coupler 11, to the receiver 12. During the marker signal, the two keying states contribute equally so that the average corresponds to the centre frequency. Thus the average of the demodulated marker is used for error assesment. The primary frequency standard in the system is constituted by the oscillator utilised by the node's receiver for frequency change. If everything is correctly adjusted, the output of discriminator 14 will be zero volts. If the transmitter at the outstation has wandered from its correct setting the output will diverge from zero. Thus, during the marker, the signal on line 20 can be regarded as an error signal. The error signal passes to both detectors 15 and 16 where it is compared with limit values held in refereces 17 and 18. If the positive error is too great an error signal is sent by detector 15 to microprocessor 19; if the negative error is too great an error signal is sent by detector 16. If the error is within the limits defined by the references 17 and 18 no signal is sent.

The microprocessor 19 receives the error signals and also the demodulated data. From the sequence, the microprocessor 19 determines what outstation is sending and forwards the traffic over line 21. It stores any error signal, received from detectors 15 and 16, for onward transmission to the appropriate outstation.

Over a suitable period of time the detectors 15 and 16 check the frequency for each outstation and, as necessary, send error signals to all the outstations.

The microprocessor 19 also receives the traffic for the outstations and it composes this traffic into packets, one for each outstation. It adds marker signals and the error signals to these packets and passes them, in suitable sequence, to the transmitter 13. This has the result that, although the node broadcasts continuously, the modulation comprises a series of packets, one for each outstation, wherein each packet begins with a marker signal and each includes the traffic and the error signal for its outstation.

An outstation (FIG. 3), suitable for receiving this transmission will now be described.

The outstation comprises an antenna 30, used in both send and receive modes. In the receive mode, coupler 31 connects the antenna 31 to receiver 32. In the send mode, coupler 31 connects the transmitter 33 to the antenna 30. The output of the receiver 32, ie demodulated signals, is connected to microprocessor 34 which is connected to send input and output traffic on line 42 and also to send error signals to counter 35 via lines 38 and 39. The microprocessor also sends tranmission data to transmitter 33. Counter 35 is connected, via lines 41a–41e (six are shown but a larger number would be appropriate for an operative station), to D/A converter 36. Transmitter 33 includes a voltage controlled oscillator and the control voltage is obtained from A/D converter on line 40. The transmitter 33 receives data for transmission from microprocessor 34 on line 37.

During a frame transmitted by the node, the outstation counts and times the packets so that it recognises its own packet. The operation of the outstation during its own packet will now be described.

After achieving synchronisation from the marker signal, the receiver 32 passes demodulated data to the microprocessor 34 which forwards the traffic on line 42.

The microprocessor 34 also separates the error signal and passes it on lines 38 and 39 to counter 35. Thus the error signal, if any, generated by positive detector 15 of the node appears on line 38 and the error signal, if any, generated by negative detector 16 of the node appear on line 38. An error signal causes the counter 35 to change by one in the appropriate direction so that the A/D converter 36 receives a different control signal. This in turn is converted to a new control voltage on line 40 so that the transmitter 33 adjusts its operating frequency closer to the standard set by the node.

It should be noted that this mode of operation limits the adjustment to a single step during any one frame. If there were a large error it would require several steps occurring over a succession of frames to correct it. As an alternative the microprocessor 19 is programmed to issue a plurality of correction signals, extending over a plurality of frames to keep the rate of one signal per frame, on receipt of one error detection (from either detector 15 or 16). It will be appreciated that error detection occurs when an outstation transmitter wanders to the extremes of the detection range; it is desirable to reduce it, at least approximately, to the centre of the range and a plurality of correction signals will achieve this.

In a preferred embodiment (not illustrated) the packets include check-sums. If checks at the destination indicate that the received data is corrupt it is preferred to inhibit the feed-back so the transmitter will remain on the same frequency until non-corrupt signals are received (and, of course, there is an error signal).

According to another preferred embodiment (not illustrated) lines 41 which correspond to large deviations from the specified frequency are connected to trigger an alarm, eg triggers may be connected to lines 41a and 41e. Where this embodiment is incorporated the range of correction available to the feed-back loop should exceed the anticipated range of error. In these circumstances the occurrence of a near extreme correction signal indicates function outside design range so an alarm to summon the attention of an engineer is appropriate. The alarms can be returned to the node via microprocessor and transmitter.

Figure 4:
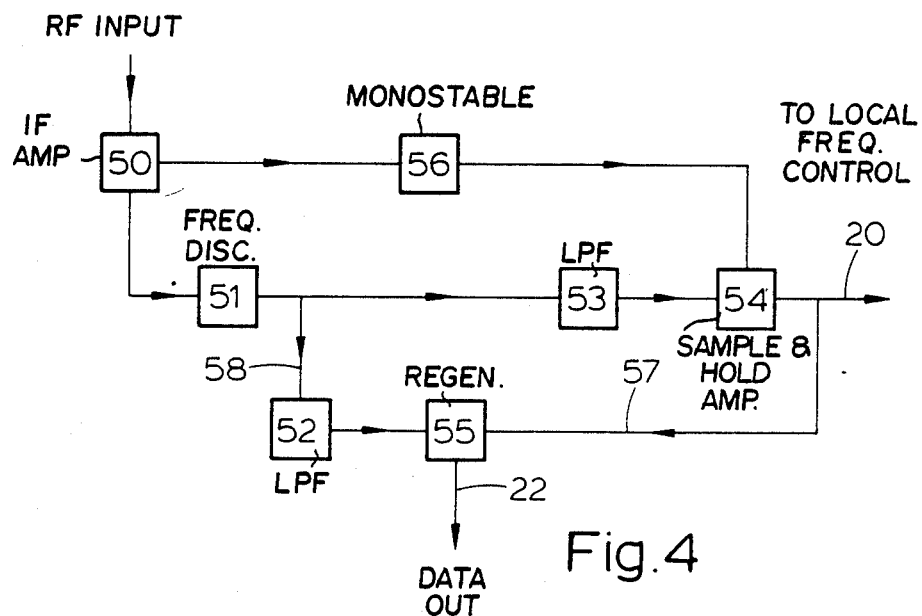
FIG. 4 illustrates a special feature for use at the node.

FIG. 4 shows, in greater detail than FIG. 2, the arrangements for error detection at the node. The arrangement includes a preferred feature not incorporated in FIG. 2.

The arrangement shown in FIG. 4 comprises an intermediate frequency amplifier 50 (which is part of the radio receiver 12 of FIG. 2) connected to a frequency discriminator 51 (which is equivalent to discriminator 14 of FIG. 2). The output of the frequency discriminator 51 splits into the feed-back loop (via low pass filter 53, sample-and-hold amplifier 54 and line 20 of FIG. 2) and the traffic channel (line 58, low pass filter 52, regenerator 55 and line 22 of FIG. 2). The arrangement also includes a monostable 56 between the IF amplifier 50 and the sample-and-hold amplifier 54. The output of the sample-and-hold amplifier is also connected to the regenerator 55.

As stated above the incoming signal, comprises a sequence of bursts, each from a different transmitter, and, because of residual errors in adjustment, each burst has a (slightly) different frequency. Each burst commences with preamble consisting of an alternation of "1" and "0", ie an alternation of the two keying frequencies.

During a burst, discriminator 51 receives the IF signal from the amplifier 50 and produces a baseband signal the mean or D.C. voltage of which is proportional to the frequency of the input. Thus the output of discriminator 51 is a signal representing:
  (a) the imperfrections in the tuning of the various outstation transmitters, and/or
  (b) the modulation.

The data is recovered from this output in regenerator 55.

The output of filter 52 also goes to smoothing circuit 53 which averages the signal thereby removing item (b) above. Monostable 56 is triggered by the presence of each new burst and it triggers sample-and-hold amplifier 54 towards the end of each preamble whereby the "hold" occurs when smoothing circuit 53 outputs a signal representative of the frequency of the transmitter. This signal is passed on line 20 (of FIG. 2) to the feedback loop described above and also, on line 57, to regenerator 55.

Regenerator 55 makes 1/0 decisions depending upon whether or not the baseband input on line 58 is above or below the control valve on line 57. Sample-and-hold amplifier 54 produces a signal which is a measure of effect (a) above, so that the decisions of the regenerator are based on (b)−(a). The operation of the invention will be further described with reference to the wave forms indicated in FIG. 5.

Figure 5A:
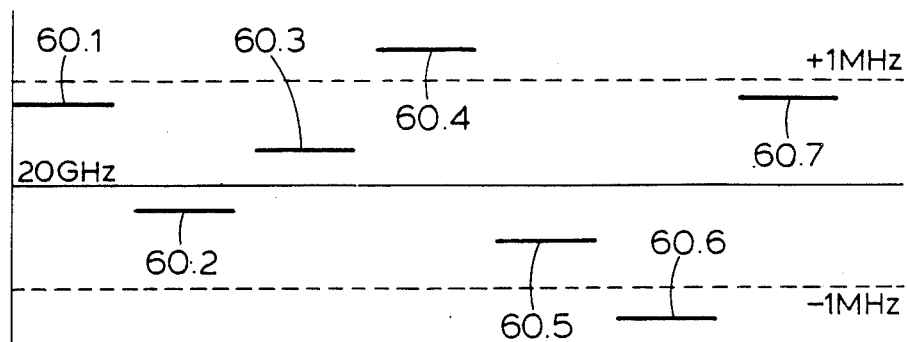
FIGS. 5A and 5B illustrate the nature of signals at the node.

FIG. 5A illustrates the scatter of carrier frequencies due to the residual errors in the adjustment of the outstation transmitters and it is a frequency/time chart of carrier frequencies received by antenna 10.

The reception is in bursts with gaps between the bursts. The frequency of the burst varies in a random way. Burst 60.4 is above the permitted error and an error signal will be generated to adjust the transmitter closer to the specified frequency. Similarly burst 60.6 is below the permitted error and its transmitter will have its frequency increased. Thus the feed back-loop controls frequency but it permits residual errors. Thus bursts 60.1, 60.2, 60.3, 60.5 and 60.7 have substantially different frequencies which differences are allowed to remain because all frequencies lie within the acceptable range. These differences appear at the output of the IF amplifier 50 and hence they affect the input to regenerator 55 which makes the task of regeneration more difficult.

Figure 5B:
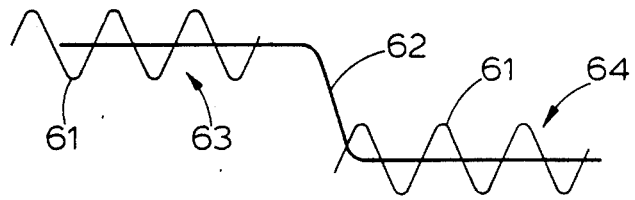

The nature of the difficulty is indicated in FIG. 5B which assumes the worst case and illustrates a burst 63 from an outstation transmitting at the upper band of acceptability followed by a burst 64 at the lower level. Trace 61 (which modulates certain features of a signal) is discontinuous because there are gaps between the bursts. Each burst begins with a marker preamble consisting of an alteration between the two keying frequencies so that the average frequency during the preamble is half way between the two keying frequencies.

Trace 62 illustrates the control signal on line 52. Since this control signal is generated by sample-and-hold amplifier 54 it remains constant between sampling instants.

During burst 63 the control signal has a high value so that regenerator 55 has a central level which facilitates its making correct 1/0 decisions. When burst 64 arrives the control signal is too high. However, the gap between the bursts is detected by monstable 56 (i.e., in other words, the monostable 56 detects a resumption of signal reception after a break therein) so that sample-and-hold amplifier 54 is triggered towards the end of the preamble. Therefore the trace 62 is readjusted to the center value of trace 61. This means that the operational condition of regenerator 55 remains substantially unchanged in spite of the sudden change in the frequency of the traffic signal.

Figure 6:
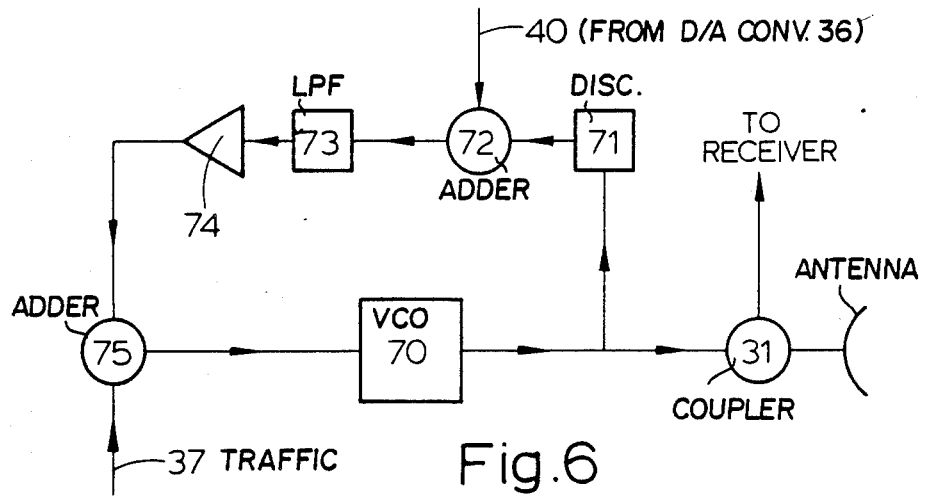
FIG. 6 is a block diagram illustrating a feedback loop for installing frequency at an outstation.

The local frequency control loop of an outstation is illustrated in FIG. 6 which indicates a preferred arrangement for transmitter 33 of FIG. 3.

The loop comprises a voltage controlled microwave oscillator 70 the output of which passes to antenna 30 via coupler 31. The loop also includes dielectric resonator discriminator 71 connected to adder 72 having as its second input, on line 40, the error signal from D/A converter 36. The other elements of the loop comprise low pass filter 73 (to remove the effect of any modulation), amplifier 74 (to give suitable loop gain) and adder 75. The second input to adder 75 is digital traffic on line 37. The output of adder 75 is connected as the control of oscillator 70.

The operation of the local loop will now be described. In the absence of a correction signal on line 40 and also in the absence of traffic on line 37 discriminator 71 produces an error signal which controls the frequency of oscillator 70. Traffic on line 37 is combined, by adder 75, with the error signal so that oscillator 70 is controlled to produce a 2-FSK signal which is received at the node. The node checks the carrier frequency and returns correction signals to the outstation, and as described above, these give rise to a correction signal on line 40. Adder 72 combines the correction signal on line 40 with the loop signal. This adjusts the set-point of the local loop so that drift at the outstation is compensated by correction from the node.

It will be noted that the system as a whole incorporates a hierarchy of measures to control or allow for instability of the transmitter at the outstations. The local loop at each outstation constitutes a control with the shortest response time. The local loop is fully capable of keeping the frequency constant for 1 ms so there is no change of frequency during a burst. Medium term requirements are provided by adjustment of the decision threshold which is carried out for every burst. Over a longer period of time drift at an outstation becomes unacceptably high, even with adjustment of the decision threshold, and the node changes the set point on line 40 to restore the transmitted frequency to the design value.

The frequency control system described in this specification is intended for use in time division multi-access systems. Such systems usually have a frame period of 20 $\mu$s to 200 ms, especially 100 $\mu$s to 10 ms. From 2 to 2000 outstations, eg 40 to 1000 outstations, can be accommodated in a single system although not all the outstations may be able to have simultaneous access. Burst lengths in the range 1 $\mu$s to 1 ms are possible but length of 10 $\mu$s to 200 s are more usual.

I claim:

1. A method of communicating between a plurality of outstations and a single node wherein said communication is carried out in a first radio channel having a first carrier frequency signal used by all the outstations to communicate with the node and a second radio channel having a second carrier frequency signal used by the node to communicate with all the outstations, characterized in that the node controls the stability of the carrier frequency used by the outstations, wherein the node assesses carrier frequency errors for each outstation and returns to each outstation a signal indicating the error, and also wherein each outstation on receipt of error signals addressed to itself adjusts the carrier frequency of its transmission so as to reduce the error.

2. A method according to claim 1, utilizing a feedback loop having an adjustable control set point for controlling the frequency of the outstation transmitter and wherein the error signals are employed to adjust the set point of said feed-back loop.

3. A method according to claim 1 wherein the radio channels are frequency modulated and wherein frequency modulated signals therefrom are demodulated and error assessments are made on the demodulated signals at the node.

4. A method according to any one of claims 1, 2 or 3, wherein the error assessments are made at predetermined intervals, as assessment on only one outstation being made during any one interval.

5. A node for participating with plural outstations in a communication mode wherein a first radio channel is used by the outstations to communicate with the node and a second radio channel is used by the node to communicate with the outstations according to any one of claims 1, 2 or 3, which node comprises
   (a) a radio receiver adapted to receive signals from a plurality of outstations on a second carrier frequency,
   (b) a radio transmitter for sending radio signals to said outstations on a first carrier frequency,
   (c) means for generating error signals indicative of the divergence of the received second carrier frequency from a specified frequency, and
   (d) means for providing said error signals to the transmitter
whereby an error signal is sent to the outstation which transmitted the signal to which an error signal relates.

6. A node for participating with plural outstations in a communications mode wherein a first radio channel is used by the outstations to communicate with the node and a second radio channel is used by the node to communicate with the outstations, which node comprises:
   (a) a radio receiver adapted to receive signals from a plurality of outstations,
   (b) a radio transmitter for sending radio signals to said outstations,
   (c) means for generating error signals indicative of the divergence of the received frequency from a specified frequency,
   (d) means for providing said error signals to the transmitter
whereby an error signal is sent to the outstation which transmitted the signal to which an error signal relates;
   (e) means for detecting a resumption of signal reception after a break therein,
   (f) averaging means operatively connected to detecting means (e), said averaging means being adapted to produce a signal indicative of the average frequency received, and
   (g) sample-and-hold means operatively connected to retain the signal produced by averaging means (f) when detector (e) indicates a resumption of reception,
wherein the error generator specified in (c) is operatively connected to receive a signal retained in a sample-and-hold means (g) and to generate error signals in accordance, therewith.

7. A node for participating with plural outstations in a communication mode wherein a first radio channel is used by the outstations to communicate with the node and a second radio channel is used by the node to communicate with the outstations and wherein the radio channels are frequency modulated and wherein frequency modulated signals therefrom are demodulated and error assessments are made on the demodulated signals at the node, which node comprises:
   (a) a radio receiver for receiving frequency modulated signals from a plurality of outstations,
   (b) a radio transmitter for sending frequency modulated signals to said plurality of outstations,
   (c) a frequency discriminator for producing a demodulated signal from an output of the receiver,
   (d) a regenerator for producing regenerated data from the demodulated signal produced by the frequency discriminator, and
   (e) a smoothing circuit for producing an average signal from the demodulated signal produced by the frequency discriminator,
wherein the smoothing circuit is connected to the regnerator so as to provide a decision threshold for the regeneration.

8. A node according to claim 7, which also comprises
   (f) means for detecting the resumption of radio reception after a break therein,
   (g) a sample-and-hold means connected to said smoothing circuit as input, to detecting means (f) as trigger, and to said regenerator to provide the decision threshold.

9. An outstation for participating with plural outstations in a communication mode wherein a first radio channel is used by the outstations to communicate with the node and a second radio channel is used by the node to communicate with the outstations according to any one of claims 1, 2 or 3, which outstation comprises:
   (a) a radio receiver for receiving signals from a node,
   (b) a radio transmitter for sending signals to the node,
   (c) means for recognizing error signals sent from the node to the outstation,
   (d) means for adjusting the frequencies of the radio transmitter, said means for adjusting being responsive to error signal recognized by item (c).

10. A method of communicating between a plurality of outstations and a single node wherein said communication is carried out in a first radio channel used by all the outstations to communicate with the node and a second radio channel used by the node to communicate with all the outstations, characterized in that
   the node controls the frequency used by the outstations;
   wherein the node assesses frequency errors for each outstation and returns to each outstation a signal indicating the error, and also wherein each outstation on receipt of error signals addressed to itself adjusts the frequency of its transmission so as to reduce the error; and
   wherein the node utilizes a data regeneration circuit having an adjustable decision threshold for determining regenerated data values and wherein the node uses the assessments of frequency errors to adjust the decision threshold used for data regeneration.

11. An outstation for participation with a node station and plural other outstations in a communication mode wherein (1) a first radio channel is used by the outstations to communicate with the node and a second radio channel is used by the node to communicate with the outstations, with the node controlling the frequency of transmitters at the outstations which outstation comprises:
   (a) a radio receiver for receiving signals from a node,
   (b) a radio transmitter for sending signals to the node,
   (c) means for recognizing error signals sent from the node to the outstation,
   (d) means for adjusting the frequencies of the radio transmitter, said means for adjusting being responsive to error signal recognized by item (c); and
a feed-back loop for controlling the frequency of the radio transmitter,
wherein said feed-back loop includes a frequency discriminator for producing a signal related to the output of the transmitter, a voltage controlled oscillator, said oscillator being included in the signal generator of the transmitter, and an analogue adder for combining a bias signal with the output of the frequency discriminator, wherein said outstation also comprises a bias signal generator adapted for control by error signals received by the outstation and connected to said analogue adder to provide the bias signal.

12. A method of communicating between a plurality of outstations and a single node wherein said communication is carried out in a first radio channel used by all the outstations to communicate with the node and a second radio channel used by the node to communicate with all the outstations, characterized in that the node controls the frequency used by the outstations;

wherein the radio channels are frequency modulated and wherein frequency modulated signals therefrom are demodulated and the error assessments are made on the demodulated signals at the node; and wherein each transmission from an outstation starts with a preamble being an alteration of two keying frequencies, the demodulated signals at the node are averaged during said preamble and error signals generated when said average falls outside a pre-set window.

13. A method according to claim 10 or 12 wherein the error assesments are made at predetermined intervals, an assessment on only one outstation being made during any one interval.

14. A node for participating with plural outstations in a communication mode wherein (1) a first radio channel is used by the outstations to communicate with the node and a second radio channel is used by the node to communicate with the outstations, (2) the node assesses frequency errors for each outstation and returns to each outstation a signal indicating the error, (3) each outstation on receipt of error signals addressed to itself adjusts the frequency of its transmission so as to reduce the error, (4) the node utilizes a data regenration circit having an adjustable decision threshold for determining regenerated data values and (5) the node uses the assesments of frequency errors to adjust the decision threshold used for data regeneration; which node comprises:

(a) a radio receiver adapted to receive signals from a plurality of outstations, (b) a radio transmitter for sending radio signals to said outstations, (c) means for generating error signals indicative of the divergence of the received frequency from a specified frequency, and (d) means for providing said error signals to the transmitter whereby an error signal is sent to the outstation which transmitted the signal to which an error signal relates.

15. A node for participating with plural outstations in a communication mode wherein (1) a first radio channel is used by the outstations to communicate with the node and a second radio channel is used by the node to communicate with the outstations, (2) the radio channels are frequency modulated and frequency modulated signals therefrom are demodulated and error assessments are made on the demodulate signals at the node, and (3) each transmission from an outstation starts with a preamble being an alternation of two keying frequencies, the demodulated signals at the node are averaged during said preamble and error signals are generated when said average falls outside a pre-set window; which node comprises:

(a) a radio receiver adapted to receive signals from a plurality of outstations, (b) a radio transmitter for sending radio signals to said outstations, (c) means for generating error signals indicative of the divergence of the received frequency from a specified frequency, and (d) means for providing said error signals to the transmitter whereby an error signal is sent to the outstation which transmitted the signal to which an error signal relates.

16. An outstation for participation with a node station and plural other outstations in a communication mode wherein (1) a first radio channel is used by the outstations to communicate with the node and a second radio channel is used by the node to communicate with the outstations, with the node controlling the frequency of transmitters at the outstations, (2) the node assesses frequency errors from each outstation and returns to each outstation a signal indicating the error, (3) each outstation on receipt of error signals addressed to itself adjusts the frequency of its transmission so as to reduce the error, and (4) each node utilizes a data regeneration circuit having an adjustable decision threshold for determining regenerated data values and the node uses the assessments of frequency errors to adjust the decision threshold used for data regeneration, which outstation comprises:

(a) a radio receiver for receiving signals from a node, (b) a radio transmitter for sending signals to the node, (c) means for recognizing error signals sent from the node to the outstation, (d) means for adjusting the frequencies of the radio transmitter, said means for adjusting being responsive to error signal recognized by item (c).

17. An outstation for participation with a node station and plural other outstations in a communication mode wherein (1) a first radio channel is used by the outstations to communicate with the node and a second radio channel is used by the node to communicate with the outstations, with the node controlling the frequency of transmitters at the outstations, (2) the radio channels are frequency modulated and frequency modulated signals therefrom are demodulated and error assessments are made on the demodulated signals at the node, and (3) each transmission from an outstation starts with a preamble being an alteration of two keying frequencies, the demodulated signals at the node are averaged during said preamble and error signals generated when said average falls outside a pre-set window, said outstation comprising:

(a) a radio receiver for receiving signals from a node, (b) a radio transmitter for sending signals to the node, (c) means for recognizing error signals sent from the node to the outstation, (d) means for adjusting the frequencies of the radio transmitter, said means for adjusting being responsive to error signal recognized by item (c).

* * * * *